(No Model.)

W. P. HARRISON.
REEL FOR CHAIN PUMPS.

No. 304,193. Patented Aug. 26, 1884.

Witnesses.
Louis F. Gardner
J. W. Garner

Inventor.
W. P. Harrison,
per
J. A. Lehmann,
Atty.

UNITED STATES PATENT OFFICE.

WILLIAM P. HARRISON, OF COLUMBUS, OHIO.

REEL FOR CHAIN-PUMPS.

SPECIFICATION forming part of Letters Patent No. 304,193, dated August 26, 1884.

Application filed October 5, 1883. (No model.)

*To all whom it may concern:*

Be it known that I, WILLIAM P. HARRISON, of Columbus, in the county of Franklin and State of Ohio, have invented certain new and useful Improvements in Reels for Chain-Pumps; and I do hereby declare the following to be a full, clear, and exact description of the invention, such as will enable others skilled in the art to which it pertains to make and use the same, reference being had to the accompanying drawings, which form part of this specification.

My invention relates to an improvement in reels for chain-pumps; and it consists, first, in making a U-shaped recess in the prong at the end of each one of the arms, for the purpose of allowing the link of the chain to sink edgewise into it.

The object of this part of my invention is to adapt the reel to chains of any kind, which are used in connection with chain-pumps, and to provide a means by which all slipping of the chain is avoided, and thus an even and continuous flow of water is secured, and the wear of both reel and chain prevented.

The second part of my invention consists in curving each one of the arms at its outer end, so as to describe a perfect arc, having for its center the bottom of the U-shaped recess in the preceding arm.

The object of this part of my invention—viz., the curve of arm downward—is to leave the distance through the whole depth of the U-shaped recess the same from the bottom of the recess in each one of the preceding arms, so as to prevent the chain from sticking or clinging to the arms, and being carried under the reel, which would occur if the arms extended out straight, by increasing the distance of the entrance to the U-shaped recess from the bottom of preceding recess.

Figure 1:
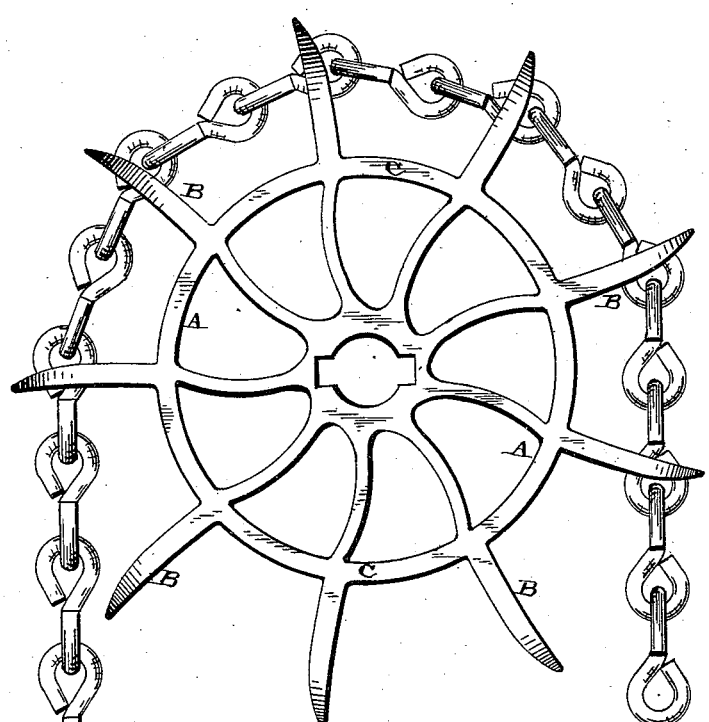
Figure 2:
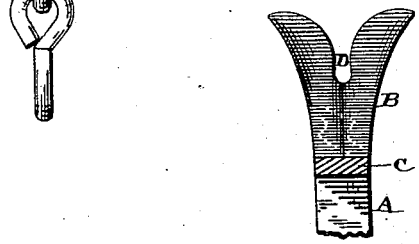

Figure 1 represents a side elevation of a reel embodying my invention. Fig. 2 is a detail view of one of the arms.

A represents the reel, the central portion of which may be of any desired construction that may be preferred. The arms B of this reel project beyond the circular rim C in the usual manner, but each one of these arms is curved downward, as shown.

Instead of the outer end of each arm being simply recessed or pronged in the usual manner, each one here has a U-shaped recess, D, formed in it, for the purpose of allowing the chain-link, of whatever kind that is used, to sink edgewise into it. Whether the links are twisted or perfectly flat, each one that comes opposite the U-shaped recess will sink edgewise into it, and then either the bent or twisted portion of that link, or the one adjoining it, will catch against the top side of the arm and prevent any slipping of the chain upon the reel. Where the ends of the arms are simply provided with V-shaped prongs in the usual manner, the chain is constantly slipping back, for the want of some means to engage positively with the links, and thus a broken or divided stream of water is raised, as well as the more serious defect of quickly wearing both reel and chain, so as to render them worthless. Where the links of the chain are made to engage positively with the arms so that the links cannot slip, a large and more even flow of water is raised and wear is prevented. The edges of each arm from the U-shaped recess upward are made sharp, as described in a former patent granted to me, for the purpose of assisting the arms to secure such a hold upon the chain as will prevent it from slipping.

Having thus described my invention, I claim—

1. A reel to be used in connection with chains, and which has a U-shaped recess made in each one of its arms for a link of the chain to slip edgewise into, substantially as shown.

2. A reel to be used in connection with chains, and which is provided with curved arms, each arm describing an arc with its center at the bottom of the U-shaped recess in the preceding arm, for the purpose described.

In testimony whereof I affix my signature in presence of two witnesses.

WILLIAM P. HARRISON.

Witnesses:
KATE VAN DINE,
MARY E. NAGLE.